Nov. 18, 1952 H. H. MERRIMAN Re. 23,586
MECHANICAL CONNECTING MEANS
Original Filed June 18, 1947 2 SHEETS—SHEET 1
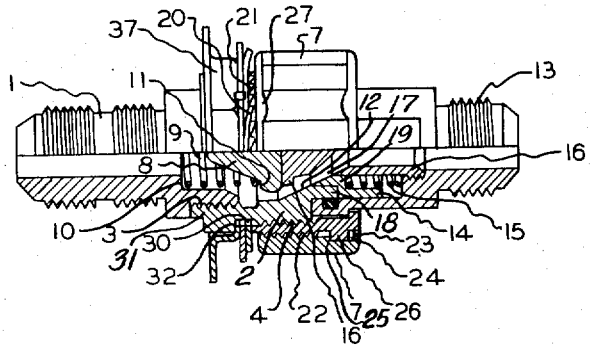
FIG. I.
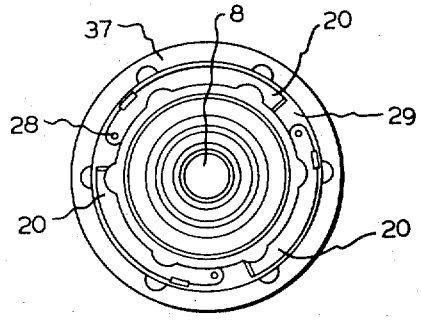
FIG. II.
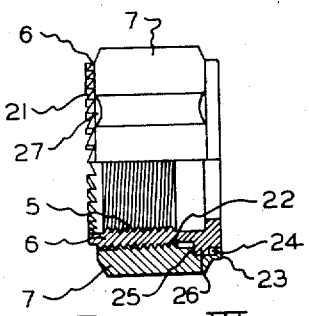
FIG. III.
Inventor
Henry H. Merriman
Lawrence F. Beaman
Attorney MECHANICAL CONNECTING MEANS
Original Filed June 18, 1947 2 SHEETS—SHEET 2
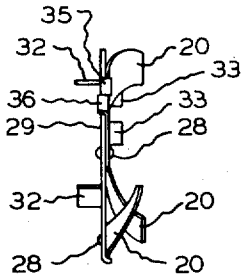
FIG. V.
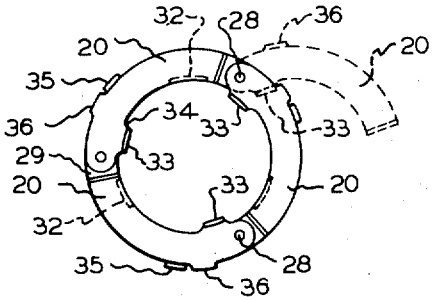
FIG. IV.
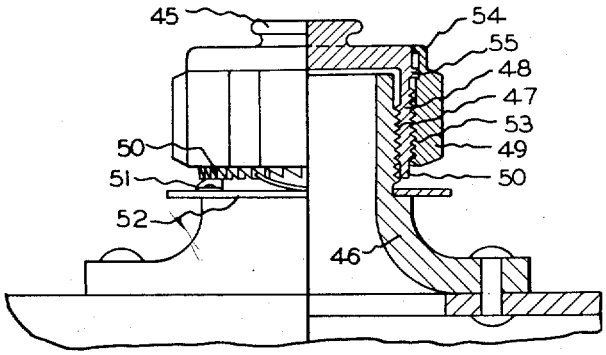
FIG. VI.
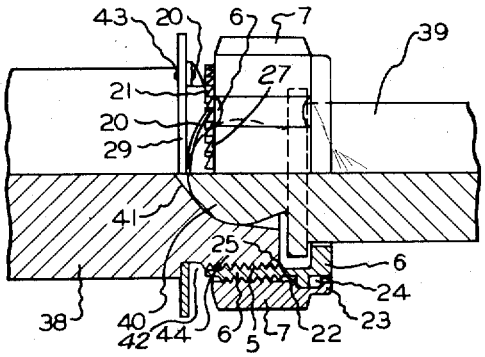
FIG. VII.
Inventor
Henry H. Merriman
Lawson & Beaman
Attorneys Reissued Nov. 18, 1952

Re. 23,586

UNITED STATES PATENT OFFICE 23,586

MECHANICAL CONNECTING MEANS

Henry H. Merriman, Jackson, Mich., assignor to Aeroquip Corporation, Jackson, Mich., a corporation of Michigan Original No. 2,489,919, dated November 29, 1949, Serial No. 755,387, June 18, 1947. Application for reissue July 8, 1950, Serial No. 172,642

7 Claims. (Cl. 151—39)

Matter enclosed in heavy brackets [ ] appears in the original patent but forms no part of this reissue specification; matter printed in italics indicates the additions made by reissue.

This invention relates to connecting means for connecting one mechanical part to another by a rotary movement of one part relatively to the other and in which a locking device is provided in order to prevent an unintentional or accidental retrograde or disconnecting movement of the rotated part from its connected position.

The rotated part is normally formed to have a screw-threaded connection with the part to which it is required to be secured and may be in the form of an interiorly screw-threaded cap or sleeve, which latter may constitute, for example, a coupling nut, while the cap may constitute the closure cap for the filling or outlet opening of a tank or like vessel, such for instance, as the closure cap for a radiator or fuel reservoir, or chamber, on a motor vehicle.

When employed in the form of a coupling nut, the invention may be applied for the coupling together, or disconnecting, of two fluid conductors, or of one fluid conductor to a fixture or to a junction piece or the nut may be more generally applied as a connecting means for use, for instance, on electric cables or like lines, which may be flexible, or rigid, and hollow, or solid.

This invention also relates to couplings, such as are employed for coupling together hose or pipe sections to form a continuous pipe line or conduit and of the kind which comprise a pair of complementary coupling or hollow body parts which are adapted to be connected together in coupled relationship by means of a common encircling coupling sleeve or nut.

The invention has for one of its objects to provide an improved coupling of the above kind in which, in the coupled condition of the parts, the coupling sleeve or nut is locked against unintentional or accidental retrograde or uncoupling movement but is automatically unlocked when the coupling sleeve or nut is positively operated to break the coupling.

The invention also has for its object to provide a coupling of the above character in which the common coupling sleeve or nut carried upon the one coupling part is provided with a series of ratchet teeth which are engaged by spring finger means carried upon the other coupling part, such that these spring finger means engage with the ratchet teeth with a pawl-like action to form a unidirectional lock to prevent retrograde movement of the sleeve or nut when the latter is rotated to effect coupling, and in which the sleeve or nut is also formed to provide, when the sleeve or nut is positively or intentionally operated in the reverse sense to effect uncoupling, that the said spring finger means are automatically forced out of engagement with the ratchet teeth so as to release the lock and thereby permit such uncoupling operation to be effected.

The invention also has for its object to provide an improved construction of ring member carrying spring finger means engageable with a coupling sleeve or nut to form a unidirectional lock to prevent retrograde movement of the sleeve or nut when the same is actuated to effect coupling, the said ring member being easy to fit in position upon its respective coupling part and permitting the spring finger means also to be readily located in their operative positions to have the desired locking engagement with the coupling sleeve or nut.

The invention also has for its object to provide a rotary connecting means for connecting two mechanical parts together in such manner that whereas locking means is automatically operative, upon the making of the connection, to prevent an accidental or unintentional retrograde or disconnecting movement of the rotated part the said means is rendered inoperative, also automatically, upon the rotary part being deliberately actuated to disconnect the parts.

These and the other objects residing in the combination, arrangement and construction of the parts will be apparent from a consideration of the following description in conjunction with the accompanying drawings, in which Fig. I is a half longitudinal section and half elevational view illustrating one application of the invention, as applied to the coupling together of a pair of fluid conductors, which latter are shown coupled together, Fig. II is a view looking on the right hand end of the male coupling part when separated from the coupling nut, Fig. III is a detail view of the coupling nut employed in the construction shown in Figs. I and II, the top half of the figure being in elevation and the bottom half in section, this figure being also representative of a coupling nut per se as provided in accordance with the invention, Fig. IV is a detail plan view, showing the ring member provided in accordance with the invention and carrying the spring latching fingers, Fig. V is an edge view of Figure IV, Fig. VI is a view, half in vertical section and half in elevation, of another application of the invention, in this instance in the form of a closure cap, and Fig. VII is a view, half in longitudinal section and half in elevation, of yet another application of the invention, in this instance in the form of a ball and socket connection.

Referring to the drawing, and first to Figures I to V, there is shown therein a coupling which comprises a hollow body part 1, which forms the male coupling part and has a male coupling portion 2 secured thereto by a screw-threaded joint 3 and which male coupling portion 2 is provided with an exteriorly screw-threaded portion 4 for receiving the correspondingly interior screw-threaded portion 5 (Fig. III) of a coupling nut, which latter has an interior portion 6 and an exterior concentric portion 7, the purpose of which will be described later.

The male body parts 1 and 2 of the coupling have arranged therein a valve 8, supported at one end of a coil spring 9, one end of which spring bears against one end of an annular shoulder 10 in the body part 1 and the other end of which spring bears against an annular shoulder 11 on the valve 8. The valve 8 engages with an annular valve seat 12 when the coupling parts are separated and thereby serves to seal the end of the male coupling part, as constituted by the hollow body parts 1 and 2.

The other and female body part of the coupling comprises a hollow body portion 13 which is adapted to be coupled to the male body portion 2 and carries the female coupling nut 6, 7, the interior portion 6 of which has the internal multiple threaded portion 5 by which the nut, as a whole, is threaded upon the exterior screw-threaded part 4 of the male coupling part 2 when it is desired to effect a coupling of the male and female coupling parts together as shown in Fig. I. Arranged within the female body part 13 is a valve sleeve 14, normally urged outwards, under the action of the coil spring 15, into engagement with its valve seat 16, but shown in Fig. I in the retracted position, brought about by the screwing-up of the coupling nut to effect the coupling of the coupling body parts together and in which retracted position of the valve sleeve 14, the ports 17 in the valve seat are opened to the passage of fluid through the coupled body parts.

In the uncoupled condition of the coupling body parts these ports 17 are closed by the valve sleeve being then urged by its spring 15 into engagement with the valve seat 16. Likewise, in this separated condition of the coupling parts, fluid flow through the male coupling part is prevented by its valve 8 bearing against its seat 12 on the interior of the body part 2.

The male and female coupling parts are connected together by moving the same into engagement with each other so that the flat end face of the valve 8 bears against the flat end face of the valve seat 16 and so that the screwed-interior 5 of the coupling nut engages the screw-threading 5, whereupon, as the nut is screwed-up the valve 8 is forced off its seat 12 against the action of its spring 9 and thus opens up the male coupling part to the flow of fluids therethrough. At the same time, the annular boss 18 on the male body part 2 engages with the shoulder 19 of the valve sleeve 14 to urge the same against the action of its coil spring 15, away from its seat 16 and thereby opens-up the ports 17 so that there is a clear fluid-flow passage through the entire coupling.

This occurs when the coupling nut is screwed in the direction to effect coupling. At the termination of its said coupling rotation, the nut is automatically held against any unintentional or accidental retrograde or reverse rotation by the engagement of spring latch fingers 20 in ratchet teeth 21 provided around the edge of one end of the inner coupling nut portion 6. These ratchet teeth and spring latch fingers are so arranged as to afford a kind of free-wheel action during the rotation of the coupling nut as a whole in the direction to effect coupling but provides a lock against rotation of the nut in the reverse direction due to the engagement of the free extremities of the spring latch fingers between those ratchet teeth against which they happen to be opposite when the coupling nut is screwed home upon the coupling part 2. The spring latch fingers are also so arranged, and are of such width, that whereas their inner edge portions are located for engagement with the ratchet teeth 21, their outer edge portions are left free and are located in the path of movement of the outer nut portion 7 for actuation by the latter when desired.

It will be seen therefore that these ratchet teeth and spring latching fingers give an automatic locking of the coupling nut against undesired un-coupling movement and such as might be produced by excessive vibration, for instance.

At the same time it is an advantage to provide that this automatically locked condition of the coupling nut should be capable of being broken, also automatically, when the coupling nut is subjected deliberately to a turning force for rotating the nut in the reverse direction to effect un-coupling.

It is for this purpose that the coupling nut is formed by the two concentric parts 6 and 7, which are connected with each other by quick-action screw-threading 22, which is opposite hand to the screw-threading 5, and the end of which outer nut portion 7 is formed with an inwardly directed radial flange or bead 23 located to partake of limited axial travel, relatively to the inner nut portion 6, within an annular recess 24 in the corresponding end of the latter remote from the end thereof having the axially extending ratchet teeth.

The construction and arrangement is such that when the nut as a whole is rotated in the direction (clock-wise as shown) to effect coupling the outer nut part 7 first rotates relatively to the inner nut part 6 until the internal shoulder 25 on the outer nut part abuts against an outwardly directed radial flange 26 on the inner nut part. This relative movement takes the free end edge 27 of the outer nut part clear of the ratchet teeth 21 to the position as shown in Figures I and III and when such position is obtained the two nut portions then rotate as one to effect the desired coupling operation.

When, however, the coupling nut is deliberately rotated in the reverse direction to effect uncoupling (such direction being anti-clockwise), and at the very commencement of such rotation, the outer portion 7 of the coupling nut will again travel axially relatively to the inner nut portion 6 but in the reverse direction (i. e. to the left as shown in Figure I) until the flange 23 is brought up against the flange 26, when the two coupling parts will then rotate as one, but at this time the spring latching fingers 20 will have been pushed out of engagement with the ratchet teeth 21, due to their having been engaged by the said free end edge 27 of the outer nut portion, and will be so pushed as the outer nut portion is moved axially to the left and relatively to the inner nut part, as just described.

The entire operation of both locking the coupling nut against unintentional or accidental retrograde rotation and of freeing the lock when required is thus performed automatically, which is highly advantageous and makes for ease of operation consistent with efficiency.

Referring now to Figures IV and V, in particular, there is shown therein a preferred and convenient construction of ring attachment carrying the spring latching fingers 20, which latter are pivoted at one end, at 28, upon one face of a ring 29 and are each of similar and arcuate construction as shown, there being three such latching fingers in the specific example illustrated although the invention is not limited to this number.

The internal diameter of the ring 29 is slightly in excess of the outside diameter of the portion of the male coupling part 2 which has the external screw-threading 5, whereby the ring can be passed over this screw-threaded portion of the coupling part 2 and be located in the annular groove 30 (Figure I) formed between a squared annular portion 31 of the body part 2 and the adjacent end of the screw-threading 5 and with the ring extending in a plane perpendicular to the plane of said body part.

The ring 29 is formed with a series (three being shown) of flexible ears 32 which are bent back from the inner periphery of the ring to lie perpendicular to the plane of the ring and are capable of having gripping engagement over the said squared surface 31, whereby to locate the ring securely in position up against the adjacent radial wall of the annular groove 30, with the ring extending radially beyond the said squared surface portion of the body part 2.

As will be appreciated, the spring latching fingers 20 are provided upon the surface of the ring 29 opposite to that from which the said ears 32 extend and these fingers at their pivoted ends, and on their inner peripheral edges, are formed with shallow lips 33 bent out from shallow radial and integral web portions 34 of the ring to project axially towards the adjacent end of the screw-threading 5 and to lie in contact with the base of the said annular groove 30. These lips 33, therefore are located on a somewhat smaller diameter than the external diameter of the said screw-threading 5 and it is for this reason that the spring latching fingers are pivotally mounted upon the ring 29 as this permits assembly of the ring and its spring latching fingers upon the male coupling part, as well as removal thereof when desired.

Thus, in order to assemble the ring in position the spring latching fingers are swung outwards about their pivots 28 into the position as shown in dotted lines in Figure IV, in which the lips 33 are located on a large diameter so as to permit the ring to be passed over the screw-threading 5 and be located in the annular groove 30 with its said flexible ears 32 in gripping engagement with the squared surface 31 of the male coupling part 2, whereupon the flexible latching fingers can be swung inwards into the position shown in Figures I, II and IV to cause the axially extending lips 33 to engage the base of the annular groove 30 with their free terminal ends located just behind the last screw thread at the corresponding end of the screw-threading 5. In this position, the outwardly bent or deflected ends of the spring latching fingers, as shown in Figures I and V, are free to "click" into engagement with the ratchet teeth 21 as the coupling nut is rotated clockwise to effect coupling but prevent a reverse rotation of the nut until the said outwardly bent ends of the latching fingers are forced backwards towards the ring 29 by the nut action above described. The latching fingers are retained in their inwardly swung and operative position by their outer peripheral edges being engaged behind inturned lips 35 on the outer periphery of the ring 29 and by oppositely directed lips 36 on the other peripheral edges of the latching fingers engaging over the outer peripheral edge of the ring. To release the latching fingers from their operative position in the groove 30 the fingers must first be stressed outwardly away from the ring to cause the edge portions thereof retained behind the lips 35 to be lifted clear of the latter, whereupon the fingers 20 are free to be swung outwardly about their pivots 28. When swung inwardly into their operative position the fingers pass over these lips 35 and fall into position with a snap action. This ring attachment is easy to apply or remove and, if necessary, can be employed to serve the dual purpose of a carrier for the spring latching fingers and as a means of securing the coupling part to a desired location, since the ring can be provided with holes to receive suitable securing screws or like means and can therefore replace the separate ring 37 normally employed for this purpose.

While the invention has been described as applied to a self-sealing coupling it is by no means limited to such application but may be employed on couplings generally which comprise two body parts adapted to be uncoupled or coupled by a common coupling member, normally in form of a nut. This and other changes in details may be made, such as would occur to one skilled in the art or which are required to meet particular working requirements or practical conditions.

Referring again to Figure III, this discloses a novel form of coupling nut consisting of the inner sleeve 6, having the interiorly screw-threaded portion 5 and provided at its locking end with the ratchet teeth 21 for engagement, automatically, with the latching fingers 20 when the nut, as a whole, is screwed home upon a part, to which it is attached, by rotation of the outer nut part 7. While this nut construction has been shown applied to form a coupling means for connecting together two fluid conductors it will be understood that it is capable of being otherwise applied and of forming a coupling nut for general application for connecting together two mechanical parts under conditions which require that the nut should be self-locked against unintentional retrograde unlocking movement but shall be automatically unlocked when deliberately actuated for the purpose of disconnection.

Figure VII, for instance, shows an alternative and useful application of a coupling nut in accordance with the invention, with the same parts thereof as shown in the previously described figures of the drawings given the same reference numerals. In this particular application of the invention, however, the coupling nut 6, 7 is employed to couple together two body parts 38 and 39, which may be hollow, or solid, and flexible, or rigid, and the opposed end of one of which body parts, that is the body part 39, is formed with a ball end 40 engaged in a cup end 41 of the other body part 38, when the two body parts are coupled together. Also, in this particular application of the invention, the ring 29 carrying the latching fingers 20 is secured about the body part 38 so as to be located in the annular recess 42 and preferably against the radial wall 43 thereof. The nut 6, 7 is carried upon the end of the other body part 39 and the interior screw-threaded portion 5 of its interior portion 6 has screw-threaded engagement with the interiorly screw-threaded annulus 4 of the cupped end of the body part 38. The method of connection and dis-connection of this arrangement will be apparent from what has already been mentioned in connection with the coupling arrangement according to the previously described figures, as also will the method of connection and dis-connection of the further application of the invention as shown in Figure VI.

Referring now, therefore, to Figure VI, this discloses the rotary connecting member as being in the form of a closure cap 45, which may be applied over the spout or like part 46 of a tank or container (not shown), which spout has an *exteriorly* [interiorly] screw-threaded portion 47 with which the correspondingly screw-threaded interior of the inner cylindrical wall or sleeve part 48 and the outer sleeve part 49 correspond also has an outer sleeve part 49. The inner cap part 48 and the outer sleeve part 49 corresponds to the nut parts 6 and 7 respectively as previously described and, as in the previously described construction, the inner cap part 48, at its free outer edge, remote from the top 45 of the cap, is provided with ratchet teeth 50 with which spring latch fingers 51 on a carrier ring 52 therefor engage in the manner and for the purpose above mentioned. Also the outer sleeve part 49 of the cap is secured to the outside of the inner cap part 48 by means of the opposite-hand screw-threading 53, whereby at the commencement of a screwing-up or unscrewing movement of the cap as a whole the outer sleeve part 49 will partake of a limited longitudinal axial movement relatively to the inner cap part 48 as determined by the inturned flange 54 at the upper end of the outer sleeve part 49 and the outwardly directed radial collar 55 on the inner cap part 48. Except that, in this instance the invention is applied to a cap closure the construction and operation of the various parts is substantially the same as above described.

Having thus described my invention, what I claim as novel and desire to protect by Letters Patent is:

1. In combination, an inner hollow body part, said body part being internally screw-threaded to permit screwing onto an externally screw-threaded supporting structure therefore incorporating a fixed pawl means, an outer hollow body part substantially enclosing and telescoped upon said inner body part, means connecting said outer body part with said inner body part to permit relative rotation and accompanying axial movement of the parts, said means being arranged to cause axial movement of said outer body *part* [parts] on said inner body part in an opposite direction to movement of said inner body part on said supporting structure, axially extending ratchet teeth at one end of said inner body part, and means limiting said axial movement of said outer body part from a position on the inner body part in which said ratchet teeth project axially beyond the corresponding end of the outer body part to a position in which said teeth are disposed entirely within the outer body part, whereby said ratchet teeth can be automatically engaged with or disengaged from said fixed pawl means consequent upon actuation of said outer body part to screw-up or unscrew said inner body part, respectively.

2. In combination, an inner nut-like part internally threaded for screwing onto a receiving structure therefore having pawl means positioned for engagement by one end of said part, an outer part comprising a sleeve portion substantially enclosing and telescopically carried upon said inner part, said outer part constituting an actuator means for rotating the inner part, a quick-action threaded connection between said inner and outer parts and of reverse direction to said interior threading on the inner part, said connection permitting the outer part to be angularly and axially displaced in opposite *directions* [direction] by rotation of said outer part, ratchet teeth at one end of said inner part and extending axially therefrom, and means interlocking said inner and outer parts for limited axial movement of the outer part upon the inner part, consequent upon rotation of the former in either direction, which axial movement moves the outer part alternately from a position in which said ratchet teeth project beyond the corresponding end of the outer part to a position in which the teeth are disposed entirely within the latter, whereby said ratchet teeth can be automatically engaged with or disengaged from said pawl means consequent upon actuation of said outer part to screw-up or unscrew said outer part, respectively.

3. The invention as defined in claim 2, said interlocking means comprising a flange on one said part concealingly engaged in an elongated groove in the other part.

*4. A nut structure comprising, in combination, an inner rotatable hollow body part and an outer rotatable hollow body part encompassing and substantially enclosing said inner body part, said body parts presenting interior portions defining an axially extending annular space with axially spaced stop means corresponding to the axial extent of said space, means interconnecting said body parts, said means including means adapted to produce relative axial movement of said body parts, to cause an end of one body part to be projected outwardly or retracted inwardly with respect to the corresponding end of the other body part, said stop means limiting the extent of said relative axial movement whereby to constrain the two body parts to rotate in unison, said outer body part constituting an actuator for rotating said inner body part.*

*5. A nut structure comprising, in combination, an inner sleeve part, said part having internal and external screw-threading with the external threading of quicker and opposite pitch to the internal screw-threading, one end of said inner sleeve part having axially extending teeth, and an outer sleeve part telescoped upon said inner sleeve part and having internal screw-threading matching and engaging the said external screw-threading in the inner sleeve part, whereby the outer sleeve part can be rotated relatively to the inner sleeve part in opposite sense thereto and with an attendant relative axial motion, said outer sleeve part substantially enclosing said inner sleeve part, and stop means on said sleeve parts limiting the extent of said axial motion and constraining the two sleeve parts to be rotated in the same sense as a unit, said relative axial movement being such as to cause the end of the outer sleeve part corresponding to said teeth on the inner sleeve part to be alternatively projected or retracted with respect to said teeth.*

*6. A nut structure comprising in combination, an inner hollow body part, said inner body part being internally screw-threaded, an outer hollow body part substantially enclosing and telescoped upon said inner hollow body part, said body parts having interior portions defining an axially extending annular space between them, means interconnecting said inner and outer body parts to permit relative rotation and accompanying axial movement of the body parts within the axial limits of said annular space, said means being arranged to cause axial movement of one said body part on the other body part in an opposite direction to movement of the last mentioned body part, and stop means limiting said relative axial movement of the one said body part from a position in which one end of the other body part is enclosed within said one body part to a position in which said end projects beyond the corresponding end of said other body part, whereby the said projected or enclosed condition of said one body part end takes place automatically consequent upon rotation of the outer body part in one direction or in the opposite direction.*

*7. A nut structure comprising in combination, an inner sleeve part internally threaded for screwing onto a receiving part, an outer sleeve part substantially enclosing and telescoped upon the inner sleeve part, said outer sleeve part constituting an actuator for rotating the inner sleeve part, a quick-action connection between said inner and outer sleeve parts and of reverse direction to said interior threading on the inner sleeve part, said connection permitting the outer sleeve part to be angularly and axially displaced in opposite directions by rotation of said outer body part and said inner sleeve part having an end portion free to be moved beyond or within the corresponding end of said outer sleeve part consequent upon said relative axial displacement occurring, and means interlocking said inner and outer parts to limit the said relative axial displacement consequent upon rotation of the outer sleeve part in either direction, said relative axial displacement causing said outer sleeve to be moved to a position in which said one end of the inner sleeve part is either enclosed within or projected beyond said end of the outer sleeve part, whereupon both sleeve parts rotate as a unit by rotation of said actuator.*

HENRY H. MERRIMAN.

REFERENCES CITED

The following references are of record in the file of this patent or in the original patent:

UNITED STATES PATENTS

| Number | Name | Date |
|---|---|---|
| 756,620 | Ghiglieri | Apr. 5, 1904 |
| 2,177,800 | Chapman | Oct. 31, 1939 |
| 2,436,206 | Deming | Feb. 17, 1948 |

FOREIGN PATENTS

| Number | Country | Date |
|---|---|---|
| 516,044 | Great Britain | Dec. 20, 1939 |